United States Patent [19]

Shepherd

[11] Patent Number: 4,827,617

[45] Date of Patent: May 9, 1989

[54] TREE CUTTING GUIDE SHOE FOR CLEARING SAW

[76] Inventor: David J. Shepherd, 1677 NW. Eden La., Roseburg, Oreg. 97470

[21] Appl. No.: 129,538

[22] Filed: Dec. 7, 1987

[51] Int. Cl.$^4$ .............................................. B27B 17/00
[52] U.S. Cl. ....................................... 30/371; 30/390; 144/1 E; 144/34 R
[58] Field of Search .................... 144/3 D, 34 R, 1 E; 30/390, 276, 289, 296 R, 371

[56] References Cited

U.S. PATENT DOCUMENTS

| | | | |
|---|---|---|---|
| 2,617,186 | 11/1952 | Pickels | 30/390 |
| 2,722,955 | 11/1955 | Ray et al. | 30/390 |
| 3,636,996 | 1/1972 | Lanz | 30/371 |
| 4,006,528 | 2/1977 | Katsuya | 30/390 |
| 4,317,285 | 3/1982 | Graham | 30/371 |
| 4,658,506 | 4/1987 | Nilsson | 30/371 |
| 4,726,118 | 2/1988 | Mattson et al. | 144/1 E |

OTHER PUBLICATIONS

Diagram of a Guide Shoe Apparatus.
Husqvarna Product Brochure.

*Primary Examiner*—W. Donald Bray
*Attorney, Agent, or Firm*—Marger & Johnson

[57] ABSTRACT

A guide shoe attachment for a clearing saw having a shaft defining a centerline, a transmission connected to the shaft including a hub rotatable in a predetermined blade rotation direction about an axis of rotation angled with respect to the centerline, and a circular blade connected to the hub. The guide shoe attachment has an elongate guide member extending radially outward from the hub generally in the direction of the centerline, parallel to and above the blade, providing a guide edge for guiding the saw. It includes a top plate forming a semicircular guard around for blade with fittings for connecting the attachment to the transmission at a position above the blade and forwardly of the transmission. The guide member includes a skid aligned with the guide edge. The guide edge is offset from a centerline of the clearing saw in the direction of blade rotation so that a tree contacting the guide edge is sawn within a kickback zone at the front of the clearing saw.

19 Claims, 3 Drawing Sheets

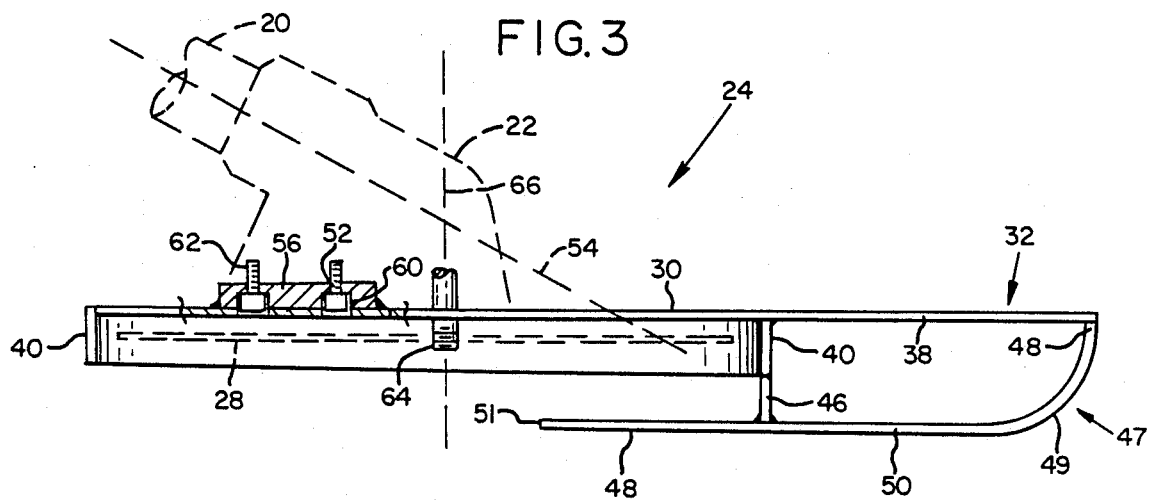
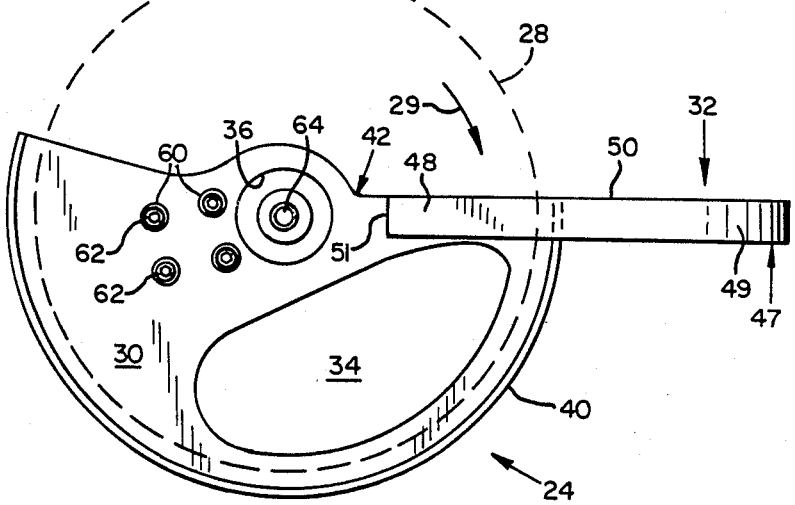
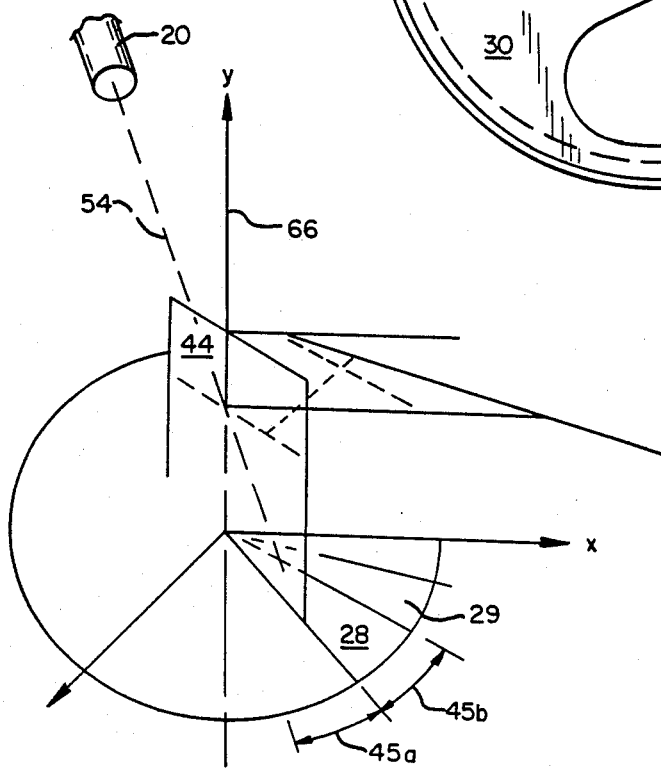

TREE CUTTING GUIDE SHOE FOR CLEARING SAW

BACKGROUND OF THE INVENTION

This invention relates to power saws and, more particularly, to hand-held power saws for cutting small trees.

Chain saws commonly are used for cutting trees. In the cutting of small trees, such as Christmas trees having a diameter of 3 to 5 inches, chain saws are difficult to use. Because of their bulk and weight, chain saws are awkward for an operator to use near ground level, especially for a long period of time. The danger of striking a rock or other hard object which might break the chain, leading to personal injury, is a real risk in using a chain saw along the ground. In addition, with chain saws it is difficult to maintain a consistent height above ground level over several cuts, and to make cuts parallel to the ground.

The ability to make repeated cuts at a consistent height, close to ground level and horizontal is particularly important in cutting Christmas trees. When the base of a Christmas tree is skewed from the horizontal plane, it must be trimmed again in order to mount it in a Christmas tree stand for household use. Also, as Christmas trees are harvested in large quantities at one time, it is desirable to have a way to cut them that is fast, relatively safe and easy to use.

Clearing saws are used for cutting weeds, grasses, small trees, and the like. A clearing saw generally includes a powerhead such as a small internal combustion engine for providing power, hand grips and a shoulder strap for holding the device in use, an elongate shaft for transmitting power from the powerhead and a clearing blade attached to a downwardly-directed hub at the end of the shaft. The shaft typically is several feet long, thereby allowing an operator to stand upright while cutting material close to ground level.

A clearing saw is very dangerous, particularly to the operator and bystanders, if its blade strikes the ground or rocks. Also, in conventional usage, cutting is only done along the lateral sides of the blade. This is because a clearing saw has a kickback zone along the front side, extending about 30° in each direction from a centerline of the shaft. If the user tries to saw a tree in this zone, the rotation of the blade in one direction will kick the cutting saw laterally in the opposite direction. Commonly, a guard is provided to protect the operator. The guard is connected to the transmission housing that connects the hub to the power shaft. It leaves the blade exposed on both lateral sides for cutting.

It has been suggested that clearing saws could be used instead of chain saws for cutting Christmas trees. It is difficult, however, to use clearing saws for this purpose. When used in the usual manner, cutting along the lateral sides of the blades, it is hard to control the height and angle of the blade relative to the ground and tree trunk. When cutting Christmas trees, it is hard to see the saw below the branches. A clearing saw is also hard to control if the operator tries to cut straight forward. The operator can better see the blade in this position but kickback makes the saw difficult to control, leading to danger and inefficiency. As with chain saws, it is difficult to cut close to the ground with striking rocks with the blade, to cut uniform height stumps and to consistently cut the tree trunks horizontally.

It has been proposed to provide a guide shoe for spacing the clearing saw above ground level by connecting a U-shaped member to the transmission, behind the hub in the manner of the aforementioned guard, with an elongate leg extending forwardly beneath the blade and along its diameter. This approach is unsatisfactory, however, as the forward extending leg can bend upward against the blade and its position in front of the blade, intended to help guide the saw along a tree trunk, hinders sawing.

Accordingly, a need remains for an improved method and apparatus which allows an operator to easily and efficiently cut small trees near the ground, substantially parallel to the ground.

SUMMARY OF THE INVENTION

It is an object of the present invention to provide an improved power saw for cutting small trees close to the ground while minimizing danger to the operator, bystanders and the saw.

A further object of the invention is to enable a clearing saw to be used for making consistent horizontal cuts close to the ground.

Another object of the present as aforesaid invention to provide a guide shoe attachment for a clearing saw for reducing the tendency of the saw to kick away from the tree.

The present invention provides an improved method and saw for cutting small trees and guide shoe attachment for clearing saws. The clearing saw includes a powerhead for providing rotary power, an elongate shaft, which defines a centerline, connected at one end to the powerhead for transmitting power from the powerhead, a transmission connected to the other end of the shaft for transmitting power to a hub, and a guide shoe attachment. The hub is rotatable about an axis of rotation angled from the shaft centerline. A circular saw blade attached to the hub defines a cutting plane normal to the axis of rotation. The method of the invention includes connecting a generally radial guide member to the transmission, positioning the guide member along the front side of the blade, preferably spaced to one side of the centerline, and cutting within the kickback zone.

The guide shoe of the invention is connected to the transmission adjacent the hub. It includes an elongate guide member extending generally radially outward from the hub alongside the cutting plane to a point beyond the edge of the blade. The guide member has a substantially straight guide edge on one side, about equal in length to the diameter of the blade, for tangentially contacting a tree. The guide edge is positioned along a side of the guide member such that in use the rotating saw blade urges the guide edge and tree trunk together.

The guide edge is preferably offset from a centerline plane defined by the shaft centerline and the axis of rotation in the direction of rotation by a predetermined amount at the blade periphery such that the centerline plane intersects the trunk of the tree during cutting. The guide edge can be offset angularly from the centerline plane by an angle in a range of zero to thirty degrees, depending upon the particular saw characteristics and blade size, and preferably in a range of five to fifteen degrees.

The guide shoe also includes a skid member having a curved nose depended from an outer end of the guide member and a flat base, extending rearwardly and spaced below the cutting plane, oriented parallel to the cutting plane. In use, the skid member contacts and slides over the ground for maintaining the blade a predetermined distance above the ground and substantially horizontal.

The guide shoe can further include an integral blade guard including a flat, substantially semicircular top plate spaced above and sized to cover about one-half the blade, including a lateral side thereof. A central aperture is provided in the top plate through which the hub extends from the transmission to the blade.

The foregoing and additional objects, features, and advantages of the present invention will be more readily apparent from the following detailed description of a preferred embodiment which proceeds with reference to the accompanying drawings.

BRIEF DESCRIPTION OF THE DRAWINGS

FIG. 3 is a side elevation of the guide shoe of FIG. 2.

FIG. 4 is a bottom view of the guide shoe of FIG. 2.

FIG. 5 is a conceptual diagram showing the geometry of the guide shoe.

DETAILED DESCRIPTION

Figure 1:
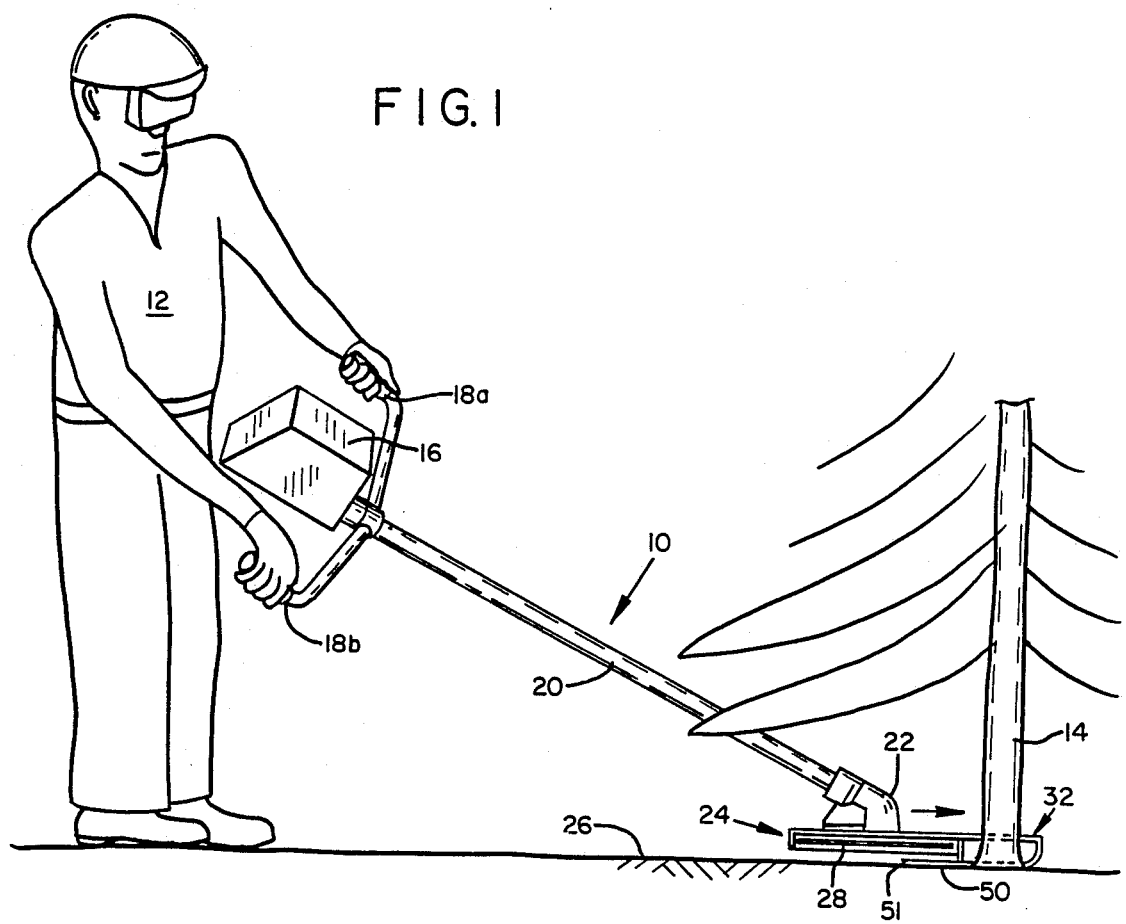
FIG. 1 is a perspective view of a tree cutting saw according to the present invention in use by an operator.

Referring to FIG. 1, a tree cutting saw generally designated 10 is shown in use by an operator 12 to cut a small tree 14 near the base of the tree. The tree cutting saw 10 is clearing saw—which generally includes a powerhead 16 for providing rotary power, hand grips 18A and 18B for holding the saw in use, a shaft 20 for transmitting power from the powerhead 16, and a transmission 22 connected to the shaft for providing the rotary power to a hub—with a guide shoe 24 in accordance with the invention attached to the transmission.

Figure 2:
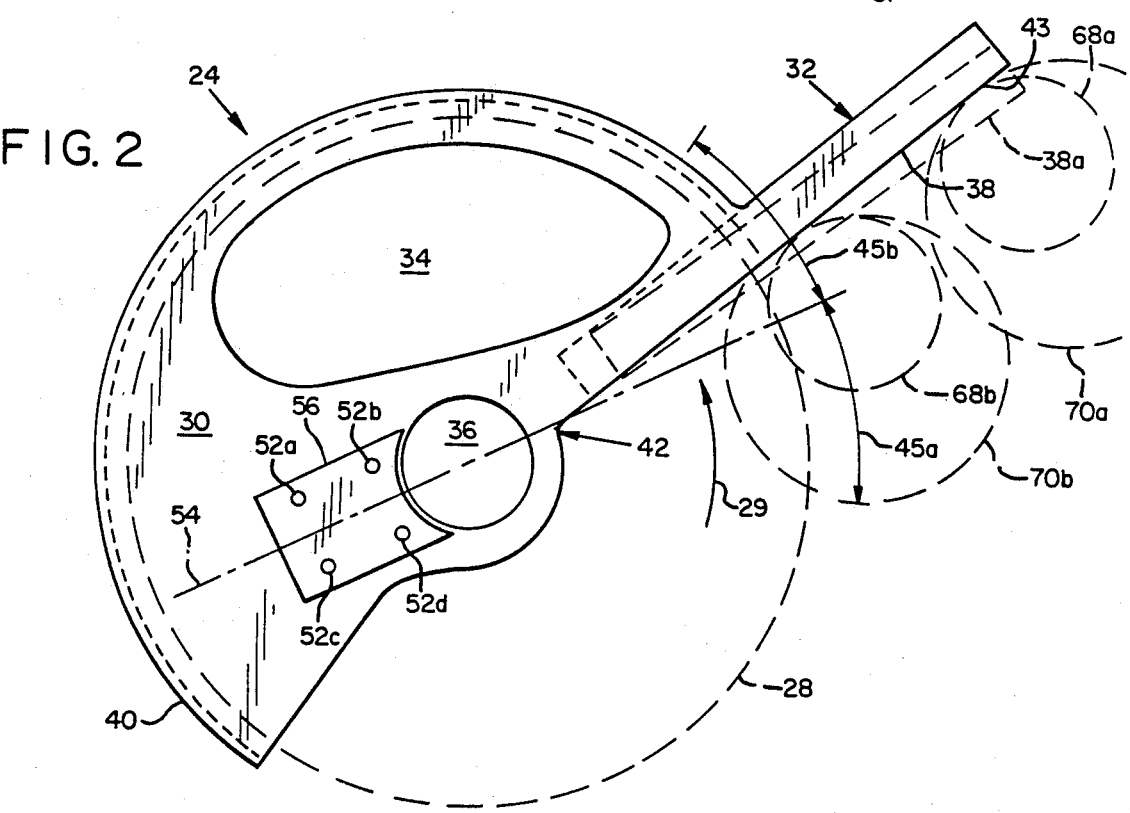
FIG. 2 is a top view of the guide shoe of the saw of FIG. 1.
Figure 1A:
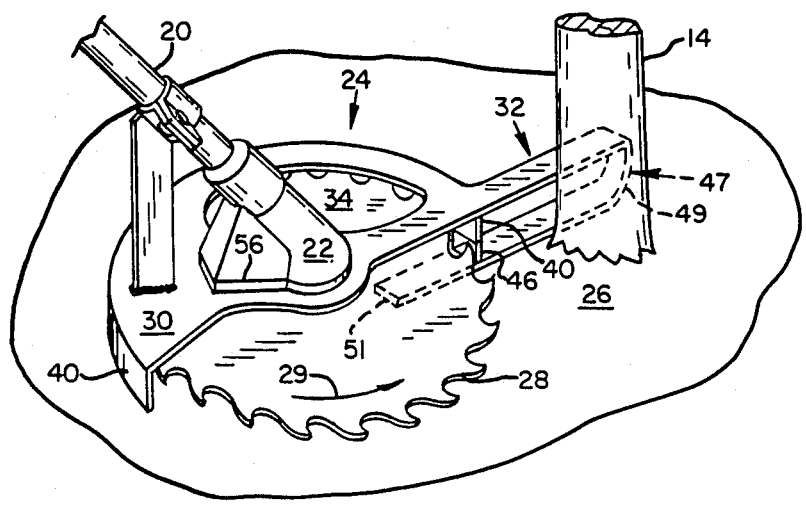
FIG. 1A is a partial, perspective view of a clearing saw like that of FIG. 1 with the guide member alongside the tree trunk preparatory to cutting.
Figure 1B:
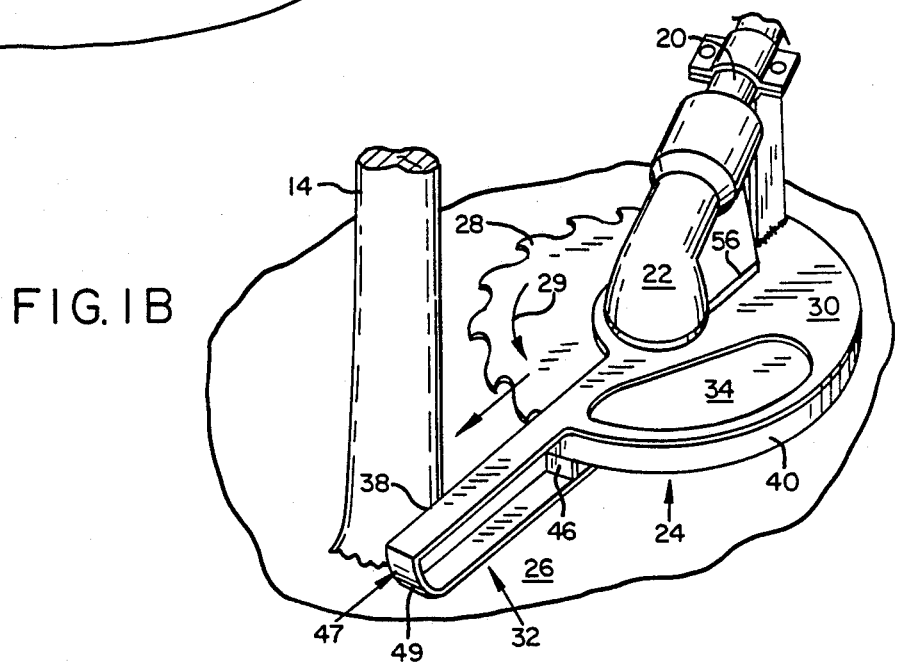
FIG. 1B is a front perspective view of the saw of FIG. 1A, which more clearly shows the angular offset of the guide member with respect to the shaft.

Clearing saws are well-known and so are described only generally. The example shown in FIGS. 2-4 is adapted for a Husqvarna clearing saw. Another make of clearing saw is shown in FIGS. 1A-1B equipped with a guide shoe 24 in accordance with the invention. The powerhead 16 is any convenient source of rotary power. It may be, for example, an electric motor. Because electric power is often not available where trees are grown, however, the powerhead is preferably an internal combustion engine. It has displacement on the order of 2-4 cubic inches (30 cc-60 cc). The shaft 20, connected to the powerhead includes a rotatable internal drive shaft (not shown) for transmitting power from the power head 16 down toward the blade. The shaft 20 defines a centerline 54, best seen in FIG. 5. It is an imaginary line having infinite length which runs through the center of the shaft for defining the shaft position and orientation with respect to other components, as described below.

Referring now to FIGS. 2, 3 and 4, the lower end of the shaft is connected to transmission 22 (shown in dashed lines in FIG. 2) which includes and rotationally drives a hub 64. A circular clearing blade 28, shown in dashed lines, is mounted on the hub 64 and defines the cutting plane (see FIG. 5).. The transmission 22 translates the rotary power from rotation about the shaft centerline 54 to rotation about an axis of rotation 66 of the hub which is angled with respect to the centerline so that the axis of rotation of the hub is substantially vertical when the tree cutting saw is held in its normal operating position. This facilitates cutting in a substantially horizontal plane. The transmission 22 may include gearing which changes the speed of the blade relative to the speed of the powerhead.

The guide shoe includes a top plate 30, made of steel, having a central aperture 36 sized to receive the hub of transmission 22. In an operative example arranged for use with a 12 inch diameter blade, the top plate is approximately 13 inches in diameter and formed ⅛ inch thick plate steel. The top plate may be of any convenient size which provides a reasonable margin, preferably of ½ inch, beyond the periphery of the blade. The size of the central aperture 36 varies according to the saw model. In the foregoing example, for a Husqvarna 165RX, it is about two inches. The substantially semicircular shape of the top plate is designed in part to provide a guard against the dangers attending flying debris. A second, larger aperture 34 reduces the weight of the unit while permitting air flow about the blade. It is positioned such that any wood chips which might exit through the second aperture will not strike the operator of the saw.

A guard wall 40 is fixed to the periphery of the top plate. The guard wall is made of ⅛ inch thick steel, approximately 1 inch high and having a length and curvature adapted to conform to the periphery of the top plate. The guard wall serves to prevent debris flying off the cutting blade from flying off the cutting blade from flying rearward toward the operator or laterally toward bystanders or co-workers. The top plate and guard wall encompass about 200 degrees of the blade.

The guide shoe 24 includes a guide member 32 extending generally radially from the hub axis 66. One edge of the guide member 32 provides a guide edge 38. The guide edge is that edge of member 32 which is positioned such that during cutting, rotation of the blade urges the guide edge and the tree trunk into mutual contact. The guide edge 38 is a straight edge having an inward end 42 which approximately lies in the centerline plane and an outer end 43 offset from the center line plane. In operation, the guide member guides the saw blade into the tree, resists kickback of the saw away from the tree.

Referring now to FIG. 5, positioning of the guide edge is best understood by reference to a centerline plane 44 defined by the centerline 54 and the axis of rotation 66. Saw guides proposed by others position a guide member substantially in this centerline plane, i.e. straight in front of the saw. This offsets the guide edge from the centerline plane in a direction counter to the direction of blade rotation and prevents the user from sawing in the central portion of the kickback zone.

I have determined, however, that the guide member 32 is best positioned by offsetting the guide edge 38 from centerline plane 44 in the direction of rotation indicated by arrow 29 so that the entirety of subzone 45A, and preferably a portion of subzone 45B as well, are available for sawing. Thus, the guide edge is preferably angularly offset in a plane parallel to blade 28 such that the guide edge and the centerline form an imaginary angle having its vertex substantially in the centerline plane. Also, the guide edge may be translationally offset from the centerline plane. The guide edge 38 is offset both translationally and angularly with respect to the hub axis and and centerline, as shown in FIG. 2. The angular offset of edge 38 can be in the range of zero to thirty degrees (i.e., subzone 45B), preferably within a subrange of 5 to 15 degrees. It is about 8½ degrees in an operative embodiment shown in solid lines in FIG. 2 and 13⅛° in another operative embodiment shown is dashed lines (38A). The guide edge shown in the drawing is fixed but, alternatively, may be positionable with respect to the centerline plane, for example to optimize the guide shoe for cutting a particular tree size.

Referring particularly to FIG. 3, the guide shoe 24 includes a skid 47, depending from the guide member, for maintaining the blade a predetermined distance above the ground when in use. The skid 32 includes a fixed end 48 attached to the end of guide member 38. The skid extends below the blade 28 and generally back toward the hub 64, parallel to the guide member. It includes an upwardly curved front end 49 and a flat base 50 extending parallel to the blade which terminates at a free end 51 positioned inward of the blade periphery. In an operative embodiment arranged for use with a 12 inch diameter blade, the overall length of the skid 47 is 10 inches. It is fabricated of 3/16 inch thick steel, one inch wide. The skid is connected to the guide member 32 by member 46 radially outward of the blade periphery.

Figure 1C:
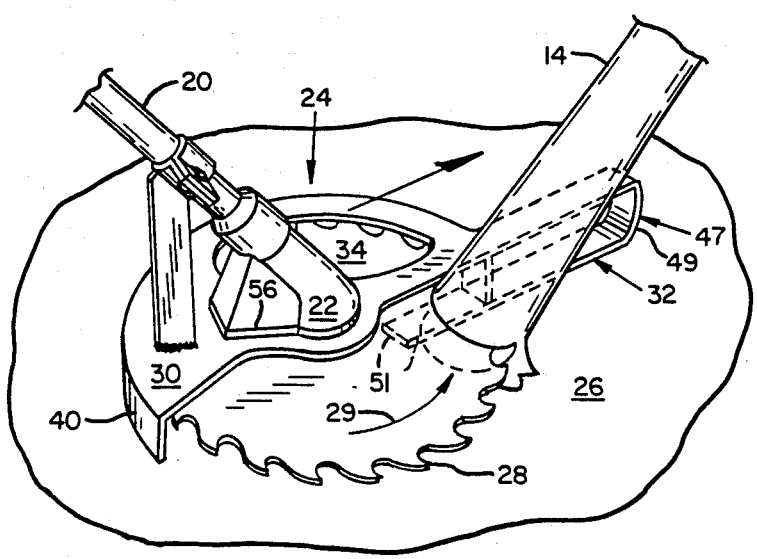
FIG. 1C shows the saw of FIG. 1A completing cutting a tree.

A mounting plate 56 for detachably mounting the guide shoe 24 to the transmission housing 22 is welded to the top side of the top plate 30 adjacent the central aperture 36. This mounting arrangement is particularly adapted to the Husqvarna clearing saw. Another equivalent mounting arrangement is shown in FIGS. 1A-1C. Alternatively, the guide shoe could be fabricated integrally with the transmission housing, obviating the mounting plate and associated hardware next described. The mounting plate has a plurality, in this case four, centersunk mounting holes 52 for mounting the guide shoe to transmission 22. Mounting holes 52 are arranged to register with mounting holes (not shown) conventionally provided in the underside of the transmission for mounting a guard. The thickness of the mounting plate is determined by the geometry of the transmission 22, and is ⅜ inch in one example. In the example illustrated in the drawing, the mounting holes 52 are arranged in a generally square pattern symmetrically disposed to either side of the shaft centerline 54.

Referring to FIGS. 1A-1C, in use, the operator positions the saw 10 was with the front end of guide member 32 alongside the trunk of the tree to be cut, and then moves the saw blade toward the tree by pushing forwardly along the centerline, i.e., lengthwise of shaft 20. Returning to FIG. 2, the saw is positioned alongside the subject tree such that the tree trunk shown by dashed circles 68A, 70A is along the guide edge (38) side of the guide member 32. Once the guide edge contacts the trunk, the operator moves the saw toward the tree, pushing substantially along the centerline. The skid 47 (FIG. 3) keeps the blade a predetermined distance above the ground. The rotating blade urges the guide member and tree trunk together to cooperate in cutting the tree easily and efficiently, while the guide member resists kickback. In comparative tests, the preferred embodiment has outperformed chain saws in both production quantity and quality.

Having described and illustrated the principles of my invention and preferred embodiments, it should be apparent to those skilled in the art that the invention may be modified in arrangement and detail without departing from such principles. I claim all modifications coming within the scope and spirit of the following claims.

I claim:

1. A tree cutting saw comprising:
power means for providing rotary power;
elongate shaft means having first and second ends and defining a centerline, attached at its first end to the power means, for transmitting said power;
transmission means attached to the second end of the shaft means, having a hub rotatable about an axis of rotation angled from the shaft centerline, for transferring said power from the shaft means to the hub, to rotate a flat circular saw blade having a toothed circular periphery mounted on the hub in a predetermined direction about said axis in a cutting plane normal to said axis, said axis and centerline defining a center line plane; and
a guide shoe supportably coupled to the transmission means;
the guide shoe including a guide member affixed to and extending outward from the transmission means alongside said cutting plane past the periphery of the blade;
the guide member having a guide edge fixed in a position spaced between the transmission means and the cutting plane for tangentially contacting a tree trunk on a side such that the saw blade, rotated in said predetermined direction by the transmission means, urges the guide edge and tree trunk together;
the guide member being offset from the centerline plane in the direction of blade rotation such that the guide edge is positioned along said centerline plane or offset therefrom in said direction of rotation.

2. The saw of claim 1 wherein the guide edge is offset from the centerline plane in the direction of blade rotation by a predetermined amount at the periphery of the blade such that the centerline intersects the trunk of a tree during cutting.

3. The saw of claim 1 wherein the guide edge is offset angularly from the centerline plane by a predetermined angle in a range of zero to thirty degrees.

4. The saw of claim 3 in which said angle is in a range of five to fifteen degrees.

5. The saw of claim 1 wherein the guide edge has an inward end positioned near the hub and extends to an outward end spaced radially outward from the periphery of the blade.

6. The saw of claim 5 wherein the guide edge is substantially straight and has a length approximately equal to the diameter of the blade.

7. The saw of claim 1 wherein the guide edge is translationally and rotationally offset from the centerline plane so as to position a tree trunk tangentially contacting the guide edge within a part of a kickback zone at a front of the blade which includes the centerline.

8. The saw of claim 1 wherein the guide shoe includes guard means spaced above the blade and including a flat, rigid, substantially semicircular top plate and depending sidewall sized to cover approximately one-half of the blade periphery along a lateral side thereof, the top plate having a central aperture for the hub to extend therethrough from the transmission means to the blade;

the guard means being integrally formed with the guide member such that the guide member extends from a peripheral portion of the top plate.

9. The saw of claim 1 wherein the guide shoe includes a skid member aligned with the guide edge and having a curved tip portion, fixed at its tip to an outer end of the guide member, and a flat base portion extending parallel to and spaced below the cutting plane such that in use the skid member contacts the ground for maintaining the blade a predetermined distance above the ground.

10. The saw of claim 9 wherein the skid member includes a spacing means positioned below and parallel to the blade for guiding the blade to make cuts parallel to the ground.

11. The saw of claim 1 wherein the guide shoe is connected to an underside of the transmission means adjacent the hub and includes:
   guard means spaced above the blade and including a flat, rigid, substantially semi-circular top plate, sized to cover approximately one-half of the blade and having a central aperture for the hub to extend therethrough from the transmission means to the blade;
   a skid member having a curved tip portion, fixed at its tip to an outer end of the guide member and a flat base portion depending from the tip portion, aligned with the guide edge and extending generally inward toward the hub, parallel to and spaced below the cutting plane such that in use the skid member contacts the ground for maintaining the blade a predetermined distance above the ground.

12. The saw of claim 11 in which the guide shoe, skid member and guard means are integrally formed and removably attachable as a unit to the transmission means.

13. A guide shoe attachment for a clearing saw having a shaft defining a centerline, a transmission connected to the shaft including a hub rotatable in a predetermined blade rotation direction about an axis of rotation angled with respect to the centerline, and a circular blade connected to the hub, the guide shoe attachment comprising:
   an elongate guide member extending radially outward from the hub generally in the direction of the centerline, parallel to and above the blade, having a guide edge for guiding the saw; and
   a flat top plate having an aperture through which the hub extends from the transmission to the blade;
   the elongate guide member being integrally connected to the top plate for connecting the elongate guide member to the transmission at a position above the blade and forwardly of the transmission.

14. A guide shoe attachment for a clearing saw having a shaft defining a centerline, a transmission connected to the shaft including a hub rotatable in a predetermined blade rotation direction about an axis of rotation angled with respect to the centerline, and a circular blade connected to the hub, the guide shoe attachment comprising:
   an elongate guide member extending radially outward from the hub generally in the direction of the centerline, parallel to and above the blade, having a guide edge for guiding the saw; means for connecting the elongate guide member to the transmission at a position above the blade and forwardly of the transmission; and
   skid means depending from the guide member defining a skid aligned with the guide edge and spaced below the blade for maintaining the blade at a predetermined distance above the ground.

15. The guide shoe attachment of claim 14 wherein:
   the connecting means includes a flat top plate and guard means including a depending sidewall integrally formed in the top plate for shielding a portion of the periphery of the blade along a lateral side of the attachment; and
   the skid means includes a fixed end connected to the top plate outward of the blade periphery and a free end spaced below the blade and positioned inward of the blade periphery.

16. The guide shoe attachment of claim 13 wherein the guide edge is offset from the centerline in the direction of blade rotation.

17. The guide shoe attachment of claim 13 wherein:
   the top plate is semi-circular and sized to cover approximately one-half of the blade including a lateral side thereof;
   the guide edge is substantially straight and has a length approximately equal to the diameter of the blade; and
   the guide edge is offset in the direction of blade rotation at an angle in the range of five to fifteen degrees from a plane defined by the centerline and the axis of rotation.

18. A method of cutting small trees, such as Christmas trees, at a predetermined distance above an underlying ground surface with a clearing saw including a powerhead, a shaft having first and second ends defining a centerline and connected at its first end to the powerhead, and a transmission connected to the second end of the shaft and having a hub rotatable about an axis angled from the centerline to drive a saw blade in a predetermined direction of rotation, the blade having a kickback zone along a front side of the clearing saw defined by an arc approximately centered about the centerline, comprising the steps of:
   connecting an elongate guide member having a guide edge spaced above the blade and a skid spaced below the blade for maintaining the blade at the predetermined distance above the ground to the clearing saw adjacent the hub;
   positioning the guide member generally radially of the blade at an angle to the centerline such that at least a part of the kickback zone including said centerline is exposed;
   activating the powerhead to rotate the blade;
   positioning the saw such that the guide edge tangentially contacts a tree trunk and the skid rests on a surface of the ground; and
   moving the saw along the ground surface toward the tree substantially along the shaft centerline to cut within the kickback zone until the tree is severed.

19. The method of claim 18 including positioning the guide edge in a plane angularly offset from the shaft centerline in the direction of blade rotation.

* * * * *